Patented Feb. 25, 1936

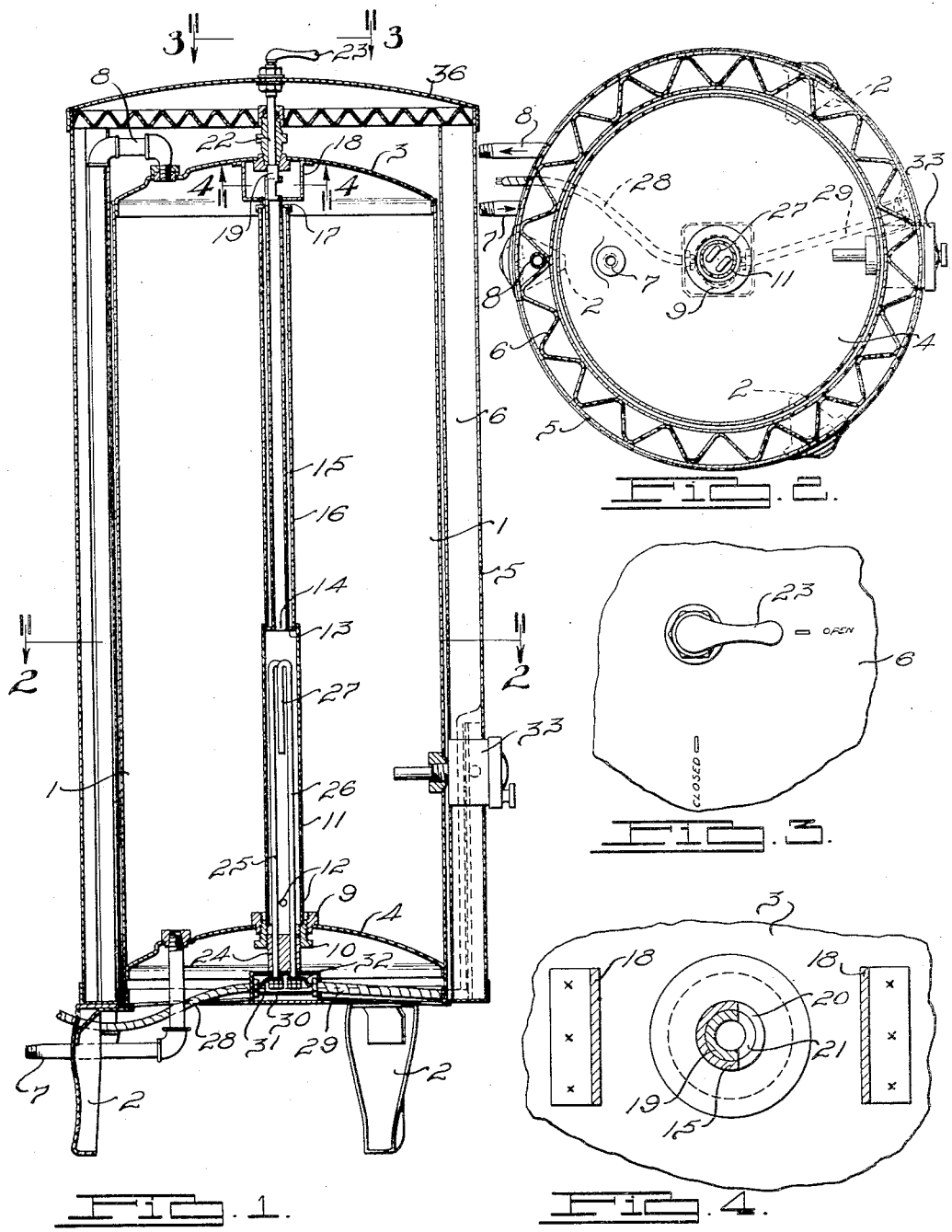

2,032,125

UNITED STATES PATENT OFFICE 2,032,125

ELECTRIC WATER HEATER

Michel S. Gazelle, Detroit, Mich.

Application September 15, 1934, Serial No. 744,189

4 Claims. (Cl. 219—39)

This invention relates to electric water heaters and the object of the invention is to provide an electric water heater in which the water is heated within a tube and is allowed to flow from the top of the said tube through a valve which controls the amount of flow.

Another object of the invention is to provide a hot water heater including a tank having a tube extending upwardly through the center thereof and provided with a valve in the top of the tube for controlling flow from the upper end of the tube, an electric heating element being mounted in the lower portion of the tube and the outlet for the tank being connected in the top of the tank adjacent the top of the tube.

A further object of the invention is to provide an electric water heater having the advantages of both the instantaneous type water heaters and the storage type water heaters, in that the hottest water from the tube is delivered near the outlet to provide hot water quickly and, at the same time, the storage tank may be filled with hot water which may be held in storage.

Another object of the invention is to provide a hot water heater in which the temperature of the water entering the storage tank or passing to the outlet may be controlled by setting a manually operable valve to restrict or regulate the flow of hot water from the upper end of the tube.

These objects and the several novel features of the invention are hereinafter more fully described and claimed and the preferred form of construction by which these objects are attained is shown in the accompanying drawing in which—

Fig. 1 is a longitudinal section through a hot water heater embodying my invention.

Fig. 2 is a section taken on line 2—2 of Fig. 1.

Fig. 3 is an enlarged section taken on line 3—3 of Fig. 1.

Fig. 4 is an enlarged section taken on line 4—4 of Fig. 1.

The device comprises a sheet metal storage tank 1 which is supported on legs 2 at the bottom and is provided with a curved bottom 4. This storage tank is enclosed in an insulating casing 5 having corrugated insulating material 6 providing insulating air spaces. This casing is also supported on the legs 2 and is provided with insulation across the top and with a cover 36 as shown. A cold water inlet 7 is provided opening into the bottom of the tank and a hot water outlet 8 is provided opening from the top of the tank and extending down the side of the tank and terminating at the bottom, as shown more particularly in Fig. 2. As shown at the bottom of Fig. 1, an opening is provided in the center of the bottom 4 and an internally threaded member 9 is secured in the opening. A member 10 is threaded into the member 9 and supports the tube 11 which is provided with apertures 12 through the wall thereof above the member 9. This tube 11 extends upwardly slightly less than one-half the height of the tank and a cap 13 is secured on the upper end of the tube and is provided with an extruded center 14 having an opening therethrough which opens into the tube 15.

This tube 15 fits about the extruded center 14 and an outer tube 16 is positioned about the tube 15 and seats in the cap 13. At the upper end, a cap 17 is provided for the tube 15 and the tube 15 extends therethrough and through a U-shaped bracket 18 secured to the underside of the head 3 of the tank. The sides of this bracket 18 are shown in Fig. 4 and a valve member 19 is fitted within the upper end of the tube 15 which extends into the bracket 18. This upper end of the tube 15 is provided with an arcuate opening 20 and the valve 19 is provided with a similar arcuate opening 21 arranged to register with the opening 20 as the valve member 19 is turned. This valve member 19 is connected by means of a shaft 22 to the control handle 23 shown in Figs. 1 and 3. The top 6 of the casing is provided with markings for the open and closed position of the handle 23 so that the handle may be turned to any point between these positions as will be understood from Fig. 3. At the bottom of the tank, a member 24 is threaded into the member 10 and carries the electric heating element which comprises two portions 25 and 26 of one continuous heating element bent to form a coil or loop 27 at the upper end, as will be understood from Figs. 1 and 2. The wires for the electric heating element are carried through conduits 28 and 29 and the wire 30 provides one side of the circuit while the wires 31 and 32 provide the opposite side of the circuit. The circuit is carried to a thermostat 33 shown in Fig. 1 which may be of any standard type adapted to break the circuit when the water about the thermostat reaches a predetermined temperature.

The wire 31 is connected to the side 25 of the electric heating element while the wire 32 is connected to the side 26 of the electric heating element so that the current will flow through the wire 31 and portion 25 of the heating element, thence through the coil or loop 27 and through the portion 26 of the heating element to the wire 32, thence to the thermostat and back through the wire 30 to complete the circuit.

In operation, the tank is filled with water through the supply pipe 7 and the water passes through the apertures 12 into the interior of the tube 11, thus filling both the tubes 11 and 15. At this time, the current may be turned on to heat the heating element thus heating the water in the tube 11 and the water as it becomes hot moves upwardly through the tube 15 and outwardly through the port 21 in the valve member 19 and through the port 20 in the tube 15 at the top. Thus, the hot water is discharged at the top of the tank and due to its heat will tend to remain at the top of the tank. When the valve is wide open, as shown in Figs. 1 and 4, considerable volume of water may pass through the apertures 12 and about the heating element and up through the tube 15 to be discharged from the top of the said tube into the top of the tank. This hot water is thus discharged near the outlet 8 so that if any of the water is used it will immediately pass through the pipe 8 to the opened faucet. However, with this device the temperature of the water at the top of the tank may be regulated.

By partially closing the valve 19, the flow from the upper end of the tube 15 may be reduced so that the water is retained for a slightly longer period about the heating element and will thus attain a higher temperature before passing from the upper end of the tube 15. In fact, it is possible to produce steam by nearly closing the valve. This valve is usually set by means of the handle 23 to produce the desired water temperature in the top of the tank so that with a very short operation of the heater, hot water will be available and the temperature of the water may be varied to meet the requirements of the person using the heater. By this arrangement, when the electric heater is energized, a very short period elapses before hot water is available through the outlet 8 giving results approximating those of an instantaneous hot water heater and, at the same time, the excess heated water will remain in the tank so that the hot water is stored up for future use. By providing insulation about the tank, the hot water may be stored in the tank thus giving the results of a storage type water heater as well as quick hot water by discharging the hottest water at the top of the tank. The tube 16 which is spaced about the tube 15 is merely to protect the tube 15 from the colder water within the tank and the tubes 15 and 16 are preferably water tight at the connection to the cap 13 and the connection to the cap 17 so as to maintain an air space about the tube 15 and prevent loss of heat from the hot water passing through said tube. I preferably provide a stop for the valve 19 so that it cannot be fully closed, as to fully close this valve would result in damage to the tubes due to the pressure generated by the heating element in heating the water.

From the foregoing description, it becomes evident that the device is very simple and efficient in operation, will not easily get out of order, will provide hot water very quickly and provides a device which accomplishes the objects described.

Having thus fully described my invention, its utility and mode of operation, what I claim and desire to secure by Letters Patent of the United States is—

1. In an electric water heater, a tank, a tube extending upwardly from the bottom of the tank and terminating near the center of the tank, an electric heating element mounted in the tube, a cap on the tube above the heating element, a second tube of smaller diameter than the first tube supported on the cap and communicating with the interior of the first tube, a tubular housing positioned about the second tube and supported on the cap, a bracket in the top of the tank, the upper end of the second tube being supported in the bracket and the tubular housing terminating beneath the bracket and being connected to the second tube beneath the bracket, a discharge pipe opening from the top of the tank, a discharge valve rotatably mounted in the top of the second tube within the bracket, a stem on the valve extending through the top of the tank, an insulating housing and cover about the tank, the valve stem extending through the insulating cover and a handle connected to the upper end of the valve stem above the insulating cover, the insulating cover being provided with open and closed position markings for said handle.

2. In an electric water heater, a tank, a tube extending upwardly from the bottom of the tank and provided with openings at the bottom opening into the interior of the tank, an electric heating element mounted in the tube, a bracket at the upper end of the tank, the upper end of the tube extending through the bracket and being provided with a discharge aperture in the side, a valve rotatably mounted in the upper end of the tube and arranged to control flow through the discharge aperture, a stem for the valve extending through the top of the tank, a handle for regulating the position of the valve connected to the upper end of the stem, an insulating housing about the tank and a discharge pipe opening from the top of the tank.

3. In an electric water heater, a tank, a tube extending upwardly from the bottom of the tank, an electric heating element mounted in the tube, the tube being open to the interior of the tank at the bottom, a second tube extending from the upper end of the first tube and terminating near the top of the tank, a tubular housing about the second tube and sealed thereto to provide an insulating space between the second tube and the tubular housing, the second tube being provided with an opening above the tubular housing into the interior of the tank, a valve rotatably mounted in the upper end of the second tube and manually operable means connected to the valve and extending exteriorly of the tank for regulating the said valve.

4. In an electric water heater, a tank, a tube extending vertically through the center of the tank and terminating beneath the top of the tank, the tube being provided with openings at the bottom into the interior of the tank and being provided with an arcuate opening in the side near the top, a valve mounted in the upper end of the tube, the said valve being adjustable to control flow from the arcuate opening in the upper end of the tube and an outlet for the tank connected into the tank adjacent the upper end of the tube.

MICHEL S. GAZELLE.